United States Patent [19]

Herback

[11] 4,020,735
[45] May 3, 1977

[54] EXPANSION BOLT

[75] Inventor: Istvan Jahnos Gohliart Herback, Huddinge, Sweden

[73] Assignee: Herbacks Industrikonsult, Huddinge, Sweden

[22] Filed: Nov. 18, 1975

[21] Appl. No.: 632,901

Related U.S. Application Data

[63] Continuation of Ser. No. 410,556, Oct. 29, 1973, abandoned.

[30] Foreign Application Priority Data

Nov. 1, 1972 Sweden .................... 14095/72

[52] U.S. Cl. ..................................... 85/67; 85/69; 85/75
[51] Int. Cl.² ..................................... F16B 13/06
[58] Field of Search ............... 85/67, 69, 73, 74, 75, 85/76

[56] References Cited

UNITED STATES PATENTS

| 527,406 | 10/1894 | Church | 85/67 |
|---|---|---|---|
| 570,786 | 11/1896 | Church | 85/67 |
| 945,403 | 1/1910 | Mohun | 85/67 |
| 1,349,437 | 8/1920 | Royer | 85/67 |
| 1,666,805 | 4/1928 | Williams | 85/67 |
| 1,953,636 | 4/1934 | Skelton | 85/67 |
| 2,075,714 | 3/1937 | Hamill | 85/67 |
| 2,332,408 | 10/1943 | Stenger | 85/67 X |
| 2,525,198 | 10/1950 | Beijl | 85/67 |
| 2,542,967 | 2/1951 | Waechter | 85/67 |
| 2,672,175 | 3/1954 | Howard | 85/75 |
| 3,009,747 | 11/1961 | Pitzer | 85/67 X |
| 3,813,986 | 6/1974 | McVittie | 85/75 |

FOREIGN PATENTS OR APPLICATIONS

| 1,095,970 | 12/1954 | France | 85/67 |
|---|---|---|---|
| 278,301 | 1/1912 | Germany | 85/69 |
| 21,739 | 7/1959 | Germany | 85/69 |
| 2,046,341 | 4/1972 | Germany | 85/67 |
| 493,749 | 8/1970 | Switzerland | |
| 873,980 | 8/1961 | United Kingdom | 85/73 |
| 1,091,657 | 11/1967 | United Kingdom | 85/67 |
| 1,008,782 | 11/1965 | United Kingdom | 85/67 |

Primary Examiner—Roy D. Frazier
Assistant Examiner—Thomas J. Holko
Attorney, Agent, or Firm—Cushman, Darby & Cushman

[57] ABSTRACT

There is provided an expansion bolt having a shank on which is arranged a primary cone and a secondary cone intended for expanding a sleeve encircling said cones subsequent to mounting the bolt in a hole intended therefor. The sleeve is divided into a number of parallel sleeve segments which when subjected to pressure by cone movement move radially outwards to form separate bolt clamping members. The shank has arranged thereon a cylindrical stop member against one end of which the primary cone engages. At the other end of the stop member, means are provided for connecting a load carrying device to the bolt. The primary cone is arranged for free rotation on the shank and has a largest outer diameter which is at least equal to the largest outer diameter of the stop member.

5 Claims, 10 Drawing Figures

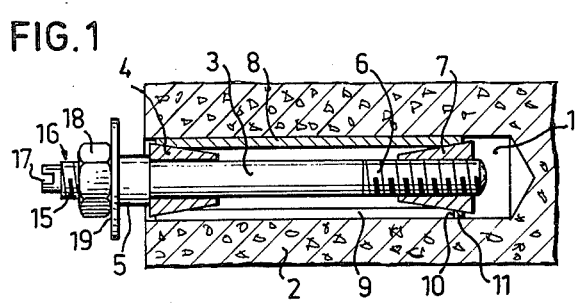
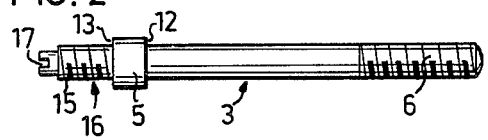
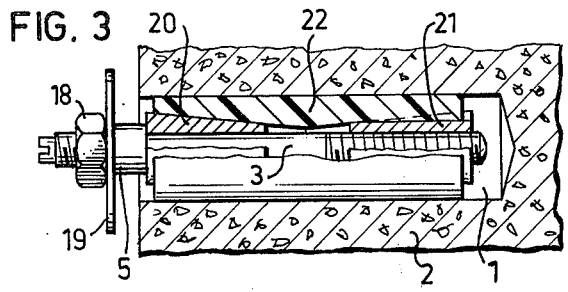
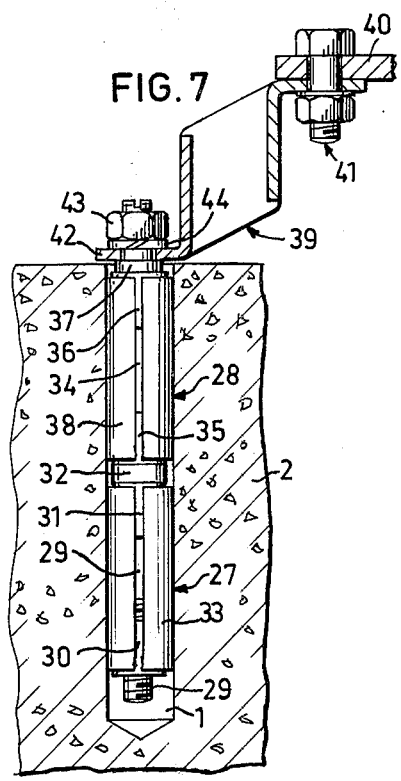
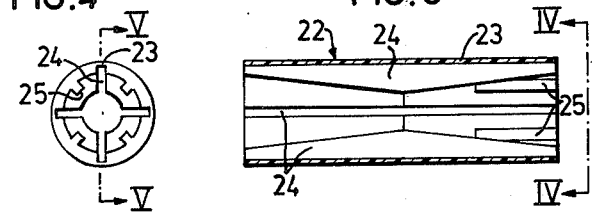
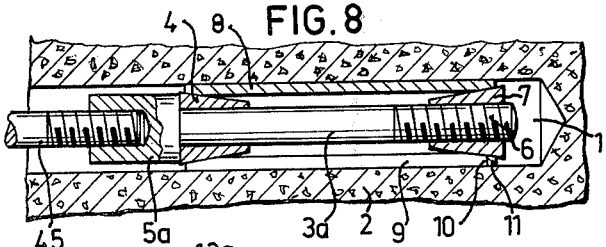
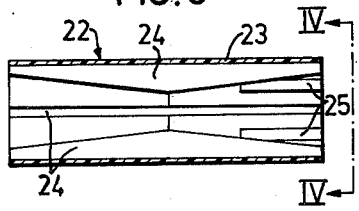
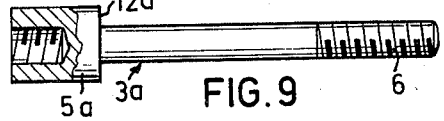
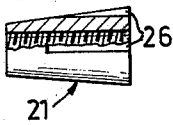
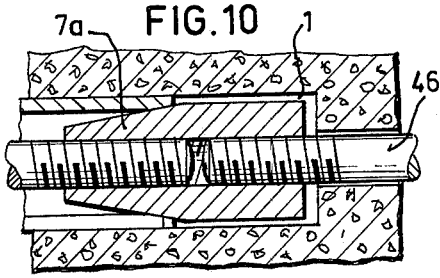

EXPANSION BOLT

This is a continuation of application Ser. No. 410,556 filed Oct. 29, 1973, now abandoned.

The present invention relates to an expansion bolt of the type which comprises a shank, the outer end portion of which is arranged to be connected to an attachment device for supporting a load subsequent to inserting the expansion bolt in a hole intended therefor; two expansion cones arranged so that the narrow ends thereof oppose each other; and an expansion sleeve supported by said cones and arranged to be divided into a number of sleeve segments subsequent to a certain degree of expansion of the sleeve of which cones one, the primary cone, located nearest the load carrying portion of the shank is mounted for free rotation thereon and is arranged to abut an axial stop located on said shank, while the other, the secondary cone, is screwed onto the shank.

An expansion bolt of this type is known from, for example, the German lay-out print No. 1,230,621.

The object of the present invention is to provide an expansion bolt which can be securely tightened in a pre-made hole, e.g. a drill hole, so that when the expansion sleeve is reliably anchored in the hole, as a result of cone movement within the sleeve, such auxiliary bolt assembly devices as nuts, washers, box spanners mounted to the outer end of the shank to facilitate tightening the expansion bolt can be removed without it being necessary to provide nuts or other means to hold the cones in their axial bolt tensioning positions on the shank, and thereby maintain the expansion sleeve in its expanded state in the hole.

This object is obtained with an expansion bolt of the aforementioned type, which is mainly characterized in that the stop against which the primary cone is arranged to abut comprises one end of a cylindrical shoulder formed integrally with the shank and having a diameter greater than the diameter of said shank, said shoulder extending axially from its inner end, against which the primary cone rotatably abuts, to its outer end, axially outwardly of which outer end the attachment device is intended to be fastened to the shank, and in that the primary cone has a largest outer diameter which is at least equal to the largest outer diameter of the cylindrical shoulder.

Thus, the shank of the expansion bolt according to the invention has a cylindrical portion (shoulder) the diameter of which is larger than the shank diameter. The ends of the cylindrical portion form fixed abutment surfaces, one of said surfaces being used as an anvil surface or reaction means as the cones are moved axially in the expansion sleeve. The other abutment surface is used as an anvil surface for the load carrying attachment device to be fastened to the outer end of the shank, i.e. to be anchored by means of the expansion bolt. By locking the attachment device in a known manner against rotation relative to the shank, it is ensured that the shank cannot be rotated relative to the cones, which in turn means that the expansion sleeve is reliably locked in its expanded state.

The division of the expansion sleeve into sleeve segments, which are arranged to part as the bolt expands so as to form generally parallel, mutually free clamping members which bear forcibly against the side of the hole in which the expansion bolt is placed, can be effected in different ways. For example, when forming the segments attention should be paid to the material from which the expansion sleeve is made and to the method applied when making said expansion sleeve.

When the sleeve is made of metal, it is often convenient to slot the expansion sleeve in a manner such that the slots extend to the end of the sleeve accommodating the primary cone, while causing said slots to terminate short of the opposite end of the sleeve, so as to leave a circular sleeve portion, said circular sleeve portion being intended to yield when the secondary cone moves into the sleeve so that the sleeve segments can be separated from each other upon expansion of the sleeve.

With another embodiment, particularly suitable for plastic expansion sleeves, the end of the expansion sleeve adjacent the secondary cone may be provided on the inside thereof with a number of axially extending splines which are arranged to engage corresponding guide grooves on the secondary cone, to prevent relative rotation of the cone and the sleeve before the circular sleeve portion yields and the sleeve segments are separated, and to maintain the axial alignment of the sleeve segments to the greatest possible extent.

So that the invention may be more readily understood and other features thereof made apparent, expansion bolts constructed in accordance with the invention will now be described with reference to the accompanying drawing.

One characteristic feature of all of the embodiments of an expansion bolt constructed in accordance with the invention is that the load carrying attachment device ensures that the bolt shank is firmly locked in the hole under all conditions and is unable to tilt therein, irrespective of whether, because of the position of the load to be carried, the expansion bolt must be mounted in a vertical, horizontal or inclined hole. The joint between the expansion bolt and the hole is equally as reliable operationally, irrespective of whether the bolt shank as a result of the actuation of the load carrying attachment device is subjected to tension forces, compression forces or transverse forces or a combination of such forces.

In the drawing,

FIG. 1 is a longitudinal sectional view of a first embodiment of the expansion bolt according to the invention, and shows the bolt mounted in a blind hole;

FIG. 2 is a side view of the shank of the expansion bolt shown in FIG. 1;

FIG. 3 is a longitudinal sectional view of a second embodiment of the expansion bolt according to the invention, the bolt being shown in an active expanded position in a blind hole;

FIG. 4 is an end view (seen from the right in FIG. 5) of the expansion sleeve used with the embodiment shown in FIG. 3;

FIG. 5 is a longitudinal sectional view of the expansion sleeve shown in FIG. 4;

FIG. 6 is a longitudinal sectional view of the secondary cone used with the expansion bolt shown in FIG. 3;

FIG. 7 is a vertical longitudinal sectional view showing how two expansion bolts according to the invention can be connected in series to anchor a machine component in a deep, blind hole, a vibration damping means being connected between said bolts and the machine component;

FIG. 8 is a longitudinal sectional view of an expansion bolt provided with a modified shank;

FIG. 9 is a side view of the shank shown in FIG. 8; and

FIG. 10 shows an embodiment having a modified secondary cone.

The expansion bolt shown in FIG. 1 is tensioned in a hole 1 located in a concrete wall 2. The expansion bolt comprises four main parts, namely a shank 3, a primary cone 4 mounted for rotation on said shank and having a thicker end against which a cylindrical abutment shoulder 5 formed integrally with the shank is arranged to bear, a secondary cone 7 screwed onto the inner end of the shank, which is provided with screw threads 6, and an expansion sleeve 8, which is supported by the cones and which is arranged to be expanded thereby so as to be securely held in the hole 1. The expansion sleeve 8 is provided with a number of axially extending slots 9 which are arranged to extend from the forward end of the sleeve to terminate short of the rear end of said sleeve, as shown at 10. Thus, prior to its being expanded by the cones 4 and 7, the sleeve comprises parallel sleeve segments which are held together by a circular sleeve end portion 11, which portion 11 is arranged to yield when the secondary cone 7 is driven into the rear end portion of the sleeve 8 as a result of rotation of the shank 3. The cylindrical abutment shoulder 5 has a larger diameter than the remainder of the shank and is provided with an inner circular abutment surface 12 against which the cone 4 is arranged to rotatably abut, and an outer circular abutment surface 13. The load carrying attachment device (not shown) to be anchored by means of the expansion bolt is mounted axially externally of said abutment surface 13. At a position in front of the abutment surface 13, as seen in the drawing, the shank 3 merges with a pin 16 provided with threads 15, the outermost end of the pin 16 having located therein a diametrical groove 17 which enables the shank to be turned by means of a screw driver for example. The threaded pin 16 is arranged to co-act with a nut 18 and washer 19. When the expansion bolt is to be secured in the hole 1, the shaft 3 is turned in relation to the sleeve 8 and the secondary cone 7, which is thereby moved axially towards the primary cone 4, whereupon the sleeve segments are moved radially apart and the cylindrical sleeve portion 11 will yield, whereby the segments move outwardly to form mutually separated tensioning members in the hole. Although with the shown embodiment the shank 3 can be turned by means of a screw driver, for example, the driving edge of which is placed in groove 17, box spanners may also be used in cooperation with special mounting nuts corresponding to nut 18, or such mounting nuts may be turned by any other type of suitable spanner, e.g. an adjustable spanner or open ended spanner. To ensure that sufficient friction is obtained between the cones 4 and 7 and the sleeve 8, the ends of the sleeve 8 are provided with internal conical seats, the configuration of which correspond to the outer configuration of the cones.

FIG. 2 is a side view of the shank 3 used with the expansion bolt of FIG. 1.

FIG. 3 shows another embodiment of the expansion bolt according to the invention, members of the expansion bolt in FIG. 3 which correspond directly with the members of the embodiment of FIG. 1 being identified by the same reference numerals. The most pronounced difference between the embodiment of FIG. 3 and the embodiment of FIG. 1 is that the cones 20 and 21 of the embodiment shown in FIG. 3 are much longer than the cones 4 and 7 in the embodiment of FIG. 1, and that the wall of sleeve 22 is much thicker than the wall of sleeve 8. The embodiment of FIG. 3 is especially intended for use when the expansion sleeve is made from a plastics material. With the embodiment of FIG. 3 the sleeve segments instead of being held together initially by a circular end portion 11 are joined by means of thin web members 23 located at the bottom of weakening groove 24 which extend parallel with the axis of the sleeve. When the cones 20 and 21 are driven into the sleeve 22, the web members 23 will yield, to enable the sleeve segments to be separated in the manner described with reference to the embodiment of FIG. 1. In addition to these differences, the expansion sleeve 22 and the secondary cone 21 of the embodiment shown in FIG. 3 are axially guided in relation to each other by means of axially extending splines 25 located on the inside of the end of the sleeve adjacent the secondary cone 21, said splines being arranged to engage corresponding guide grooves 26 (see FIG. 6) located on the outside of the secondary cone 21. This spline and groove joint prevents mutual rotation of the cone 21 and the sleeve 22 when the cone 21 is driven into the inner end of the sleeve upon rotation of the shank 3. When the web members 23 yield, the spline and groove joint also serves to maintain the axial alignment of the separated sleeve segments.

FIG. 5 is an axial longitudinal sectional view of the expansion sleeve 22 used with the embodiment of FIG. 3, and FIG. 4 is an end view of the expansion sleeve 22. FIG. 6 shows the secondary cone used with the embodiment of FIG. 3, seen in partial longitudinal section and shows the configuration of guide grooves 26.

As will be seen from FIG. 7, two expansion bolts 27, 28 constructed in accordance with the invention can be used when the load carrying attachment device is to be anchored in a deep hole, for example in an engine bed. With this embodiment the shanks of the expansion bolts must be connected in series. The inner (lower) expansion bolt 27 has a shank 29 which is arranged to co-act with a threaded secondary cone 30 and a rotatable primary cone 31, which is provided with an extension sleeve formed as abutment portion 32. The sleeve segments of the expansion bolt 27 are identified by the reference numeral 33. The upper bolt has a shank 34 which carries a secondary cone 35, which is mounted for rotation on said shank and which is arranged to abut the portion 32, and a rotatable primary cone 36, which is arranged to abut an abutment portion 37 formed integrally with the shank 34. The shank 34 may be formed integrally with the shank 29, although with the illustrated embodiment the lower end (inner end) of the shank 34 is screwed to the upper end of the shank 29. The expandable sleeve segments of the expansion bolt 28 are identified by the reference numeral 38. The expansion bolts 27,28 which act like a single, extended expansion bolt, are used with the embodiment of FIG. 7 to support via a vibration damping means 39, an attachment portion 40 of a machine component or a machine. The reference numeral 41 indicates a bolt having nuts attached thereto and connecting the portion 40 to the vibration damping means 39, while the reference numeral 42 indicates a flange cooperating with said vibration damping means, said flange being held securely between the portion 37 and a washer 44 placed beneath the nut 43. The embodiment of the series-connected expansion bolts of FIG. 7 is particularly suitable when it is desired to take up large attachment forces in a relatively weak hole.

FIG. 8 shows a modified embodiment of the expansion bolt when said bolt is intended to be placed to a certain depth in a deep hole. With the illustrated embodiment the abutment portion 5 and the pin 16 are replaced by a larger and longer abutment portion 5a, which is provided with a threaded hole in its forward end, as seen in the drawing, said hole being intended to accommodate the end of an extension shaft 45, the threaded end portion of which is screwed into the hole. FIG. 9 shows the form of the shank 3a used with the embodiment of FIG. 8.

FIG. 10 shows another modified embodiment with which the load on the expansion bolt is partially relieved by means of an extension shaft 46, which is arranged to extend through the material surrounding the hole 1 (said material forming, for example, part of a ceiling or a wall) and is anchored at its end not shown in the drawing by means of a nut. In this instance, a cone 7a is arranged to extend rearwardly with a cylindrical portion, which is provided with an internal thread having the same pitch as the cone thread. The extension shaft 46, which may be of the same type as that shown in FIG. 8, is screwed into the cylindrical portion of the cone.

An important advantage afforded by the expansion bolt construction of the present invention, is that both the bolt and the material in which it is mounted can be inspected when the bolt is operatively engaged in the hole and before (or after) the load carrying attachment device to be anchored by the bolt is attached thereto (or detached therefrom).

Further, it lies within the purview of the invention to provide the cylindrical abutment portion 5 of the shank 3 with an axial length which is at least equal to half the outer diameter of the abutment portion. Thus, the axial length of said cylindrical abutment portion may be such that the forward end of the expansion sleeve adjacent the primary cone is spaced from the outer end of said abutment portion even when the sleeve segments are outwardly extended to their fullest extent by the cones.

What I claim is:

1. An expansion bolt comprising:
   a cylindrical metallic shank having an externally threaded end portion, an opposite end portion adapted to be connected to a load carrying attachment device subsequent to anchoring the bolt in a cylindrical hole and a cylindrical abutment portion having a shoulder with a diameter greater than the remainder of the shank and disposed adjacent the opposite end portion between the end portions;
   two metallic expansion cones having axially extending holes therethrough and disposed on the shank so that their narrow ends oppose each other, a first of the cones being free to rotate about the shank and disposed with its largest diameter end in abutting relation to the shoulder of the abutment portion, the largest diameter end having a diameter at least equal to the diameter of the shoulder, a second of the cones having inner threads mating with the threaded portion of the shank for rotation thereon, and a plurality of grooves extending radially inwardly from the outer surface of the second cone;
   an expansion sleeve made of plastic material and having a continuous cylindrical outer wall and open ends, said sleeve having in the interior thereof seats engageable with the cones, said seats being conical and corresponding to the outer configuration of the cones and extending from the large diameter of each conical seat from opposed open ends of the sleeve and intersecting and terminating at a point substantially halfway between the ends of the sleeve, each of said cones being movable into and out of the respective open end of said sleeve so that the larger ends of said cones can reside outside the ends of said sleeve, said sleeve having internal axially extending weakening grooves for permitting the wall of the sleeve to separate along the grooves when the sleeve is stretched outwardly by action of the cones thereby forming a number of parallel separate sleeve segments, the end portion of the expansion sleeve adjacent the second cone having a plurality of splines on its inner surface corresponding to the grooves on the second cone whereby mutual rotation of the second cone and the sleeve before the sleeve segments are separated from each other, is prevented.

2. An expansion bolt according to claim 1, characterized in that the cylindrical abutment portion of the shank merges with a pin at the outer end of said portion, said pin comprising the outer end of the shank and being provided with a thread arranged to co-act when necessary with a mating thread member.

3. An expansion bolt according to claim 2, characterized in that the cylindrical abutment portion of the shank has an axial length which is so selected that the forward end of the expansion sleeve adjacent the first cone is located at a distance from the outer end of the abutment portion even when the sleeve segments are extended to their maximum extent by the cones.

4. An expansion bolt according to claim 1, characterized in that the cylindrical abutment portion of the shank has an axial length which is at least equal to half the outer diameter of the shoulder of the abutment portion.

5. An expansion bolt according to claim 1, characterized in that the cylindrical abutment portion of the shank has an axial length which is so selected that the forward end of the expansion sleeve adjacent the first cone is located at a distance from the outer end of the abutment portion even when the sleeve segments are extended to their maximum extent by the cones.

* * * * *